UNITED STATES PATENT OFFICE 2,627,491

PENICILLIN SALTS OF SUBSTITUTED ALKYLENE DIAMINES

Joseph Lester Szabo, Drexel Hill, and William F. Bruce, Havertown, Pa., assignors to Wyeth Incorporated, Philadelphia, Pa., a corporation of Delaware No Drawing. Application July 15, 1950, Serial No. 174,115

11 Claims. (Cl. 167—65)

This invention relates to derivatives of ethylene diamine and its homologues and, more particularly, to new mono- and poly-substituted-aminoalkylene diamine salts.

Certain substituted alkylene diamines have been found with bronchodilator and antihistaminic action and also found useful as intermediates in the preparation of desired organic compounds. In addition, it has been discovered that many of these compounds are useful for separating penicillin from aqueous solutions by forming a salt therewith. Many of these salts are substantially insoluble or, at most, sparingly soluble in an aqueous medium. One is thus able to isolate and, if desired, to purify penicillin since it has been found that the latter can be almost quantitatively removed from its solution by the addition of two molecules of penicillin to these particular diamines.

As an additional discovery, these substantially insoluble or sparingly soluble salts of penicillin have been found to be valuable from a pharmacological aspect since they are relatively non-toxic and, when in contact with body fluids, slowly release penicillin for utilization in combatting bacterial infections. A prolonged antibiotic effect can thus be achieved without difficulty. By the use of these new penicillin salts, one greatly reduces the number of injections required to sustain the desired blood level concentration of penicillin.

The useful diamines are those falling within the following general formulae:

R—NH(CH$_2$)$_n$NH$_2$; R—NH(CH$_2$)$_n$NH—R$_1$; and RR$_1$N(CH$_2$)$_n$NH$_2$ where R, R$_1$ may represent either aliphatic, aromatic, alicyclic or heterocyclic radicals with and without substituents on the rings. In the alkylene portion of the molecule, $n$ is intended to represent a numeral greater than 1, preferably from 2 to 12.

Representative of important alkylene diamines useful in the isolation of penicillin salts are unsubstituted N,N'-dibenzyl ethylene diamine and those aralkyl compounds having non-interfering substituents on the ring. These substituents, which may also be on the alicyclic and heterocyclic rings as well as on the alkyl chains, may comprise one or more alkyl, alkoxy, halogen, nitro, amino, oxy or hydroxy ring substituents. As a matter of fact, no substituent has been found which interferes with the reaction of the N,N'-di-substituted secondary diamines with penicillin salts to form reaction products therewith.

In accordance with one method of preparing the di-substituted diamines of the invention, one starts with an aldehyde or ketone which may, if desired, be solubilized in a suitable solvent such as alcohol or benzene. To the aldehyde or ketone is added the alkylene diamine, generally in aqueous solution. The reaction product, which is a diamine having the formula:

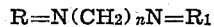
$$R{=}N(CH_2)_nN{=}R_1$$

wherein R, R$_1$ and $n$ are the same as indicated before, is isolated and is then hydrogenated by catalytic reduction or by a metal-alcohol or metal-acid combination.

The poly-substituted bases can alternatively be made by the reaction of an alkylene dihalide, such as the dibromide, dichloride or diiodide, with the appropriate amine.

Substituted ethylene diamine salts may also be prepared by interacting approximately equivalent quantities of a salt of ethylene diamine, such as the dihydrochloride, dihydrobromide, dinitrate, diacetate or other suitable salt of ethylene diamine and an acid, with formaldehyde either in the form of its aqueous solution or as the solid polymeric form, paraformaldehyde, and with a compound containing an active hydrogen such as the alpha-hydrogen of thiophenes, picolines, quinaldines, phenols, aliphatic nitrocompounds, organic acids and esters, and open-chain and cyclic aldehydes and ketones in a suitable solvent such as water, alcohol or other organic solvents or mixtures thereof, resulting in an N,N'-disubstituted ethylene diamine salt which may be transposed into the free base by alkali treatment.

If the product obtained is to be used for the preparation of penicillin compounds, it is best used as a salt rather than in the form of the free base. The salts may be formed from the free base by dissolving the latter in a solvent, such as ether, to which is added the proper acid, depending on the particular salt desired.

The salts formed may be either mono-salts or di-salts depending on the amounts of base and acid used. Thus, if one mol. equivalent each of acid and base were used, the mono-salt would be formed. On the other hand, if two mol. equivalents, or an excess of acid, are used with one mol. of the diamine, the di-salt would be formed. For making penicillin salts from the diamines, one would generally desire the double salt instead of the mono-salt since two mols. of penicillin would be combined when using the former, whereas only one mol of penicillin combines with the mono-salt.

Inorganic or organic acids may be used in forming the salts from the free base substituted alkylene diamines. As examples of useful inorganic acids may be mentioned hydrochloric, sulfuric, phosphoric, nitric or hydrobromic acids. Organic acids which have proved useful are acetic, lactic, succinic, malic, aconitic, aminoacetic and tartaric acids. While others will form suitable salts, those organic compounds mentioned will form highly desirable soluble salts whose solubility in water exceeds about 5% by weight per unit of liquid volume at about 30° C.

In preparing penicillin salts, the diamine salts are generally solubilized in an aqueous medium and reacted with an aqueous penicillin salt solution. Where the reactions are to take place in an aqueous solution, it has been found advantageous to use relatively soluble diamine salts in preparing the penicillin salts thereof since less liquid volume is handled and therefore losses are likely to be less than if relatively insoluble salts were used. While salts made with the inorganic acids can be used in preparing the penicillin compounds, it has been found that their solubility is quite low and well below 5% on a weight basis. Consequently, the diacetates, having a solubility in the neighborhood of about 10% or higher have been found particularly effective where it is desired to handle relative low liquid volumes and therefore high concentrations.

Any of the known soluble penicillin salts may be combined with the substituted diamines. Thus, one may use the alkali or alkaline earth metal salts of penicillin G, dihydro F, X, or penicillin K for combination with the selected diamine. However, the more preferred penicillin salts are the sodium or potassium salts of penicillin G. One or two molecules of any penicillin above indicated will unite with one molecule of the diamine, depending on the use of the mono- or the di-salt.

The following examples are given for specific illustrations but it should be understood that these are selected for illustration of the invention and not to be considered limitative.

EXAMPLE 1

*Prep. No. 1 of N,N'-dibenzylethylenediamine and salts thereof*

N,N'-dibenzylethylenediamine was first prepared by condensing benzaldehyde with ethylene diamine. The dibenzylethylenediamine (23.6 g.) was dissolved in 100 cc. methanol containing 0.5 g. Adams' platinum catalyst and hydrogenated at 50 lbs. pressure. Slightly more than the theoretical amount of hydrogen was absorbed in 45 minutes. The catalyst was filtered off, washed with methanol, the filtrate concentrated and the residue fractionated. Nearly all of the material distilled 160° and 0.75 mm., $n_D^{20}$ 1.5621.

With Raney nickel catalyst at room temperature little hydrogen absorption occurred, however, under elevated pressure hydrogenation went to completion but was much slower than with platinum. The diacetate was prepared by dissolving 440 g. of the base in about 3 liters of 95% alcohol and slowly adding 220 g. of glacial acetic acid. After standing some time the crystalline solid was filtered off and recrystallized from hot alcohol. Long, white needles, M. P. 110–112°.

Calcd. for $C_{16}H_{20}N_2 \cdot 2CH_3COOH$: C, 66.7; H, 7.78; N, 7.78. Found: C, 66.98; H, 7.63; N, 8.38. Solubility 252.9 g. per liter of solution at 30.4° in water. The dihydrobromide was obtained by adding hydrobromic acid to an aqueous solution of the acetate. Large colorless plates, recrystallized from water, M. P. 300° (bar). Calcd. for $C_{16}H_{20}N_2 \cdot 2HBr$: N, 6.97; Br, 39.8. Found: N, 6.9; Br, 39.5. Solubility 30.0 g. per liter of solution in water at 30.4°.

The dihydrochloride was obtained from the acetate by addition of hydrochloric acid and recrystallized from water. Large white plates, M. P. 294° (bar). Calcd. for $C_{16}H_{20}N_2 \cdot 2HCl$: N, 8.97; Cl, 22.4. Found: N, 8.8; Cl, 22.4. Solubility 23.9 g. per liter of solution in water at 30.4°.

The dinitrate was obtained by adding nitric acid to a solution of the acetate. Large white plates, M. P. 274° (bar). Calcd. for $C_{16}H_{20}N_2 \cdot 2HNO_3$: N, 15.3. Found: N, 14.9. Solubility 9.04 g. per liter of solution at 30.4°.

The phosphate was obtained by adding phosphoric acid to a solution of the acetate and recrystallized from dilute alcohol. White prisms, M. P. 232° (bar). Calcd. for $C_{16}H_{20}N_2 \cdot 2H_3PO_4$: N, 6.42; P, 14.2. Found: N, 5.45; P, 13.9. Solubility 38.6 g. per liter of solution at 30.4°.

The sulfate was obtained by addition of sulfuric acid to a solution of the acetate and recrystallization from alcohol. White plates, M. P. 247–250°. Calcd. for $C_{16}H_{20}N_2 \cdot H_2SO_4$: C, 56.8; N, 8.29; H, 6.51; S, 9.47. Found: C, 56.37; H, 6.43; N, 7.99; S, 9.85. Solubility 15.8 g. per liter of solution at 30.4°.

The thiocyanate was prepared by addition of a solution of sodium thiocyanate to the acetate and recrystallized from alcohol. White needle-like plates, M. P. 212° (bar). Calcd. for $C_{16}H_{20}N_2 \cdot 2HCNS$: N, 15.63. Found: N, 15.4.

The salicylate was obtained by addition of a solution of sodium salicylate to a solution of the acetate and recrystallization from water. White crystals, M. P. 85° (bar). Calcd. for $C_{16}H_{20}N_2 \cdot 2C_7H_6O_3$: N, 5.42. Found: N, 5.24.

The picrate was obtained from the acetate by addition of a solution of lithium picrate and recrystallization from alcohol, M. P. 211° (bar).

The oxalate, $C_{16}H_{20}N_2 \cdot H_2C_2O_4$, was obtained as colorless needles from alcohol, M. P. 275–6°.

The lactate was prepared by mixing alcoholic solutions of the acid and base. Fine white crystals, M. P. 74°.

The salts of succinic, propionic, malic, aconitic, aminoacetic and tartaric acids did not precipitate out on addition of their aqueous sodium salt solutions to the solutions of the acetate indicating that these salts were substantially water-soluble. To obtain these salts, the solutions are evaporated to dryness. A better procedure to obtain a purified product is to solubilize the diamine free base in an organic solvent such as alcohol, acetone, diethyl ether, etc., and add the free acid also in solution in an organic solvent. The desired salt will either precipitate from solution, or the solvent solution may be evaporated to dryness.

EXAMPLE 2

*Prep. No. 2 of N,N'-dibenzylethylenediamine and salts thereof*

Ethylenediamine (15 g., 0.25 mol.) was added dropwise to 100 ml. 98–100% formic acid in a two-necked 500 ml. flask, fitted with an addition tube and reflux condenser with drying tube, cooled in an ice-bath. After complete addition of the base, 53 g. of benzaldehyde (0.5 mol.) was added in one lot. The ice-bath was removed and the flask was heated to the refluxing temperature. The initial rate of carbon dioxide evolution was too rapid to measure. After twenty minutes, the rate was circa 100 ml. per minute and decreased rapidly to 8 ml. per minute in one hour. Heating at reflux was continued for 35 hours.

Following the refluxing most of the excess formic acid was removed under reduced pressure. Hydrochloric acid (200 ml. 6 N) was added to the viscous amber residue and heated under reflux. After 15 minutes, bumping necessitated cooling and filtering to remove crystalline dihydrochloride, which after washing with isopropanol was dried, M. P. circa 300°. The mother liquors were refluxed one hour and cooled, obtaining an additional amount of product, M. P. circa 300°. The filtrate was concentrated in vacuo to 100 ml., cooled and made alkaline with 40% NaOH. The supernatant oil was extracted with ether, dried, and fractionated from a stillpot packed with glass wool and heated in a sand-bath at 320°. The first fraction at 106° at 0.6–0.7 mm. was N-benzylethylenediamine (dipricate, M. P. 222°). The N,N'-dibenzylethylenediamine was collected at 177–206° at 0.6–1.0 mm. as a colorless liquid.

Crystalline dihydrochloride was converted to free base with aqueous sodium hydroxide and distilled over sodium hydroxide at 153–158° at 0.5 mm. The colorless distillate solidified to white crystals melting at 24–25°.

EXAMPLE 3

Prep. of N,N'-dipiperonylethylenediamine and salts thereof

Piperonal, 150 g. (1 mol.), was dissolved in 400 cc. ethanol and treated with 35 g. (0.5 mol.) of aqueous ethylenediamine (78%) and allowed to stand a short time (heat is evolved). The resulting white crystalline solid N,N'-dipiperonalethylenediamine was filtered off, washed with alcohol and dried. Yield is theoretical, M. P. 179–180°.

A mixture of 388 g. (2.4 mols.) of the above compound in 1500 cc. methanol and 1 g. of Adams' platinum catalyst was hydrogenated at 810 lbs./sq. in. until the required amount of hydrogen was taken up. The solution was then concentrated to remove most of the methanol, taken up in water containing acetic acid and hydrochloric acid then added to obtain the slightly soluble hydrochloride which was recrystallized from hot water, M. P. 277–280°. Calcd. for $C_{18}H_{22}O_4N_2Cl_2$: C, 54.0; H, 5.5; N, 7.0; Cl, 17.4. Found: C, 54.39; H, 5.41; N, 7.04; Cl, 17.55.

The hydrochloride was converted to the free base by treatment with strong alkali and extraction with ether. The free base is a white crystalline solid (needles), M. P. 145–8° C.

The diacetate salt, prepared from the free base in ether by addition of glacial acetic acid, is a white crystalline solid, M. P. 133–4° C. Calcd. N, 6.25. Found: 6.25, 6.44. Calcd. M. W., 448. Found: 448.

The flavianate was obtained in yellow crystals, M. P. 230° C. dec. (bar). The picrate was obtained from acetone in yellow needles, M. P. 216° C. dec.

EXAMPLE 4

Preparation of N,N'-difurfurylethylenediamine and salts thereof 170 grams of ethylene diamine (78%) was vigorously stirred with 500 cc. benzene in a nitrogen atmosphere while being cooled in ice. Then 454 g. furfural was slowly added and stirred an hour after addition was complete. The benzene layer was removed and dried over solid sodium hydroxide.

Without isolating the above product a portion of the benzene representing 200 g. of product was reduced in 3 liters of absolute alcohol with 350 g. of sodium. The alcohol was partially removed, water added and extracted with ether. The ether layer was then dried, the ether removed and the residue fractionated. The N,N'- difurfurylethylenediamine distilled at 131–141°/0.15 mm., $n_D^{22.5}$ 1.5183.

The diacetate, prepared by solution of the base in ether and adding acetic acid followed by recrystallization of the filtered solid from ethyl acetate, formed. White needles which melted unsharply about 100–104°. Calcd. for $C_{16}H_{24}N_2O_6$: C, 56.5; H, 7.06; N, 8.23. Found: C, 56.84; H, 7.02; N, 8.32.

The picrate was obtained as large golden-yellow prisms of M. P. 165–167.5° or as large, clear dark-yellow plates of M. P. 178° dec. (bar). Calcd. for $C_{12}H_{16}O_2N_2 \cdot 2C_6H_3O_7N_3$: C, 42.5; H, 3.24. Found: C, 42.73; H, 3.11.

EXAMPLE 5

Preparation of N,N'-bis-(2-heptyl)-ethylenediamine and salts thereof 131.1 g. of 2-heptylamine and 214 g. of ethylene bromide were warmed on the steam-bath yielding a brownish-red syrup. On stirring the syrup with ether it slowly dissolved and precipitated a white solid. The solid was filtered off and recrystallized from methanol, M. P. 282°. Calcd. for $C_{16}H_{36}N_2 \cdot 2HBr$: N, 6.7; Br, 38.2. Found: N, 6.09; Br, 36.0. The picrate had M. P. 150°.

The hydrobromide was treated with sodium hydroxide solution yielding an oily upper layer which was extracted with ether. The ether layer was dried over solid sodium hydroxide, the ether removed and the residue fractionated. The product had B. P. 125–127° at 2 mm., $n_D^{20}$ 1.4498. Calcd. for $C_{16}H_{36}N_2$: C, 75.0; H, 14.07; N, 10.9. Found: C, 73.41, 73.05; H, 12.50, 12.36; N, 10.58.

EXAMPLE 6

Preparation of N,N'-bis-(gamma-phenylpropyl)-ethylenediamine and a salt thereof 44 g. of cinnamaldehyde was slowly added to 15 cc. ethylenediamine-water azeotrope. In a short time the reaction mixture solidified. Benzene was added to dissolve the solid and the water of reaction removed by drying over calcium chloride. After cooling and addition of some ether, light tan crystals formed which were filtered off and air-dried. The solid in methanol was hydrogenated over Adams' platinum catalyst and after 12 lbs. gauge hydrogen was absorbed, the methanol was removed and the residue was fractionated. The first fraction was gamma-phenylpropanol, B. P. 101–108°/1 mm., $n_D^{20}$ 1.5309. The second fraction was N,N'-bis-(gamma-phenylpropyl)-ethylenediamine. B. P. 155–162°/0.25 mm., $n_D^{20}$ 1.551. The dihydrochloride decomposed between 260 and 270°, M. P. 274° (bar). Calcd. for $C_{20}H_{28}N_2 \cdot 2HCl$: C, 65.0; H, 8.2; N, 7.6. Found: C, 66.43, H, 8.18; N, 7.3.

EXAMPLE 7

Preparation of N,N'-dicyclohexylethylenediamine and salts thereof 200 g. of cyclohexylamine and and 50 g. ethylene chloride were warmed several hours on the steam-bath until the material became solid. Hot water was added and the mixture was made strongly alkaline. The oily layer began to crystallize as soon as it cooled a few degrees, and was separated from the liquid, large colorless crystals, M. P. 99°. On recrystallization from dilute alcohol the solid melted at 82°, yield 77.5 g. Calcd. for $C_{14}H_{28}N_2 \cdot H_2O$: N, 11.6. Found: N, 10.91.

The following salts were obtained by adding the corresponding acids to an alcohol solution of the base until no further precipitation occurred and recrystallizing the crude products from water:

Dihydrochloride, white plates, M. P. 315° (bar). Calcd. for $C_{14}H_{28}N_2 \cdot 2HCl$: N, 9.43. Found: N, 9.14.

Dihydrobromide, white plates, M. P. 339° dec. (bar).

Dinitrate, small white crystals, dec. 230° (bar).

Diflavianate, small yellow crystals, dec. 312° (bar).

Phosphate, white plates, M. P. 313° (bar).

Picrate, yellow crystals, M. P. 218° (bar).

Sulfate, large white plates, m. above 350° (bar).

The acetate was prepared in ether from the base and acetic acid as large white crystals, M. P. 144°.

The acetate in water solution on treatment with potassium cyanate yielded the corresponding bis-urea, small white crystals from dilute alcohol, M. P. 248° (bar).

The dinitroso compound was prepared from the acetate and sodium nitrite in water. White crystalline flakes, M. P. 130–1° (bar).

EXAMPLE 8

*Preparation of N,N'-bis-(4-methyl-2-pentyl)-ethylenediamine*

200 g. of 2-amino-4-methylpentane and 94 g. of ethylene bromide were warmed on the steam-bath. The reaction was quite vigorous. The material was treated with a strong solution of sodium hydroxide and the dark oily layer extracted with ether. The ether layer was dried over alkali, the ether removed and the residue fractionated. After taking off all material up to a bath temperature of 200° at atmospheric pressure the remaining material comprising the desired product distilled between 95 and 97° at 1 mm., $n_D^{25}$ 1.4419.

EXAMPLE 9

*Preparation of N,N'-bis-(3,5,5-trimethylhexyl)-ethylenediamine and its salts*

286 g. of 3,5,5-trimethylhexylamine and 50 g. ethylene chloride were warmed on the steam-bath for several days after which time the reaction mass was very viscous and jellied on cooling. Water was added followed by a strong solution of sodium hydroxide. This was extracted with ether, the extract dried over solid sodium hydroxide, the ether removed and the residue fractionated. The fractions boiling between 123 and 200° at 0.06 to 0.08 mm. were combined and refractionated. Most of the material distilled 149 to 154° at 1.2 mm. and had $n_D^{22.5}$ 1.4548.

The acetate was prepared by adding acetic acid to an ethereal solution of the base and recrystallizing from ethyl acetate, small white flakes, M. P. 105°. Calcd. for $$C_{20}H_{44}N_2 \cdot 2CH_3COOH:$$

N, 5.84. Found: N, 6.40.

The hydrobromide was prepared by adding hydrobromic acid to an alcoholic solution of the base and recrystallizing the product from dilute alcohol, fine white crystals, M. P. 246° (bar). Calcd. for $C_{20}H_{44}N_2 \cdot 2HBr$: 5.36; Br, 30.6, Found: N, 5.8; Br, 33.15.

The hydrochloride was prepared in the same manner as the hydrobromide. Large white plates, M. P. 256° (bar.)

The nitrate was obtained as above. Large white flakes, M. P. 214° (bar). Solubility 2.14 mg./ml. at 30°.

The phosphate obtained as above was recrystallized from dilute alcohol.

The sulfate was recrystallized from water. White crystals, M. P. 290° (bar) dec. Calcd. for $C_{20}H_{44}N_2O_4S$: N, 6.83. Found: N, 6.31.

EXAMPLE 10

*Preparation of N,N'-bis-(p-chlorobenzyl)-ethylenediamine and its salts*

25 g. of p-chlorobenzyl chloride, 5 g. of nearly anhydrous ethylenediamine and 50 cc. of xylene were warmed to 100° for several hours. A solid gradually formed. On cooling the reaction mass, water was added followed by a strong solution of sodium hydroxide. The oily layer was extracted with ether and the ether layer was then extracted with dilute acetic acid. The acid layer was made alkaline and extracted with ether. The ether layer was dried over magnesium sulfate and filtered through carbon. Glacial acetic acid was then added to the ether solution as long as a precipitate formed which was then removed and recrystallized from ethyl acetate to give fine white crystals, M. P. 126° (bar). Calcd. for $$C_{16}H_{18}N_2Cl_2 \cdot 2CH_3COOH$$

N, 7.8. Found: N, 7.21.

The picrate was obtained from an aqueous solution of the acetate by addition of lithium picrate. Fine yellow crystals, M. P. 193° (bar).

EXAMPLE 11

*Preparation of N,N'-bis-(2,4-dichlorobenzyl)-ethylenediamine and its salt*

25 g. of 2,4-dichlorobenzyl chloride, 4 g. of nearly dry ethylenediamine and 50 cc. of xylene were heated at 100–130° overnight. Water and alkali were added to the cooled reaction mass, which was extracted with ether and the ether layer extracted with dilute acetic acid. The acid extract was made alkaline and extracted with ether. The ether layer was dried over magnesium sulfate and glacial acetic acid was added to the filtered ether extract. After allowing the ether to evaporate a sirupy residue remained which crystallized very slowly. The picrate was obtained as yellow crystals, M. P. 183° (bar) dec.

EXAMPLE 12

*Preparation of N - mono - (p-hydroxybenzyl)-ethylenediamine and its salts*

Ethylenediamine (30 g., 0.5 mol.) was added dropwise to 150 ml. 98–100% formic acid in a two-necked 500 ml. flask, fitted with an addition tube and a reflux condenser with drying tube, immersed in an ice-bath. After complete addition, 122 g. (1.0 mol.) of p-hydroxybenzaldehyde was added all at once, the ice-bath replaced with a heater, and the reaction heated to reflux. After 18 hours, carbon dioxide evolution had decreased to 3.4 ml. per minute. Approximately 65 ml. of formic acid was removed under reduced pressure, and the reddish residue poured into 400 ml. 6 N hydrochloric acid and stirred and refluxed one hour. After cooling and filtration to remove a reddish scum, the filtrate was diluted with acetone, precipitating 25 g. of ethylenediamine dihydrochloride as white crystals, M. P. 310°. The mother liquors were taken to dryness on a steam-bath, leaving a black solid which was leached with hot water and filtered (removing color with superfiltrol). The filtrate was taken to dryness under reduced pressure leaving a light-tan solid residue which was suspended in alcohol and filtered, affording white crystals, M. P. 208°. A sample recrystallized from aqueous alcohol melted at 214° (bar) and proved to be N-mono-(p - hydroxybenzyl) - ethylenediamine dihydrochloride.

The dipicrate was prepared by adding aqueous lithium picrate to an aqueous solution of dihydrochloride, M. P. 214°. The yellow precipitate was crystallized twice from aqueous ethanol, M. P. 214° (bar).

EXAMPLE 13

*Preparation of N,N'-bis-(p-aminobenzyl)-ethylenediamine and a salt thereof*

N,N' - bis - (p - nitrobenzyl) - ethylenediamine monoacetate (0.43 g., 1.16 millimols), prepared by reacting one mol. equivalent of free base with one mol. of acetic acid, and 0.10 g. platinum oxide were placed in a 50 ml. Erlenmeyer flask with 10 ml. methanol. The flask was attached to a reservoir of hydrogen, flushed with hydrogen and then shaken at room temperature and atmospheric pressure. Reduction was complete in 70 minutes with theoretical uptake of hydrogen. The catalyst was removed by filtration, and addition of 0.4 ml. 6 N hydrochloric acid to the filtrate precipitated the dihydrochloride. The white crystals were recrystallized from aqueous methanol, M. P. over 300°.

EXAMPLE 14

*Preparation of N,N'-bis-(p-methoxybenzyl)-ethylenediamine and salts thereof*

Ethylenediamine (30 g., 0.5 mol.) was added dropwise to 150 ml. 98–100% formic acid in a two-necked 500 ml. flask, fitted with an addition tube and reflux condenser with drying tube, immersed in an ice-bath. After complete addition, anisaldehyde (136 g., 1 mol.) was added all at once, the ice-bath replaced by a heater, and the reaction heated to reflux. Evolution of carbon dioxide through the drying tube was occasionally determined by displacement of water. Ten minutes after attaining reflux, the rate was 175 ml. per minute, at one hour 21 ml. per minute, and at 17 hours 3 ml. per minute, at which point heating was discontinued. Excess formic acid was removed under reduced pressure at water-bath temperature. The dark viscous residue was taken up in 800 ml. ethanol and 500 ml. 6 N hydrochloric acid, and the mixture stirred and refluxed for six hours. The resulting mixture of solvent and crystals was cooled in an ice-bath, filtered, and the white crystals washed with ethanol. The dried dihydrochloride had an M. P. 278–280°. A portion recrystallized from 50% aqueous alcohol melted 287°. Calcd. for $C_{18}H_{26}N_2O_2Cl_2$: C, 57.90; H, 7.02; N, 7.51; Cl, 19.0. Found: C, 58.41; H, 7.31; N, 7.37; Cl, 19.4.

A dipicrate was prepared from an aqueous solution of dihydrochloride by addition of aqueous lithium picrate. The yellow precipitate was recrystallized first from ethanol and then from aqueous acetone, M. P. 215°. Calcd. for $C_{30}H_{20}N_8O_{16}$: C, 47.50; H, 3.99; N, 14.77. Found: C, 47.65; H, 4.27; N, 14.53.

A dinitrate was prepared by addition of dilute nitric acid to an aqueous solution of the dihydrochloride. The white precipitate was recrystallized from water, M. P. 220° dec. Calcd. for $C_{18}H_{26}N_4O_8$: C, 50.70; H, 6.15; N, 13.14. Found: C, 50.97; H, 6.17; N, 13.44.

EXAMPLE 15

*Preparation of N,N'-bis-(2-thenyl)-ethylenediamine and a salt thereof*

In a 500 ml. three-necked flask, fitted with stirrer, condenser and thermometer, were mixed 42 g. (0.5 mol.) of thiophene, 33 g. (0.25 mol.) ethylenediamine dihydrochloride and 43 ml. of 36% aqueous formaldehyde (0.5 mol.). The mixture was stirred and heated to gradually raise the temperature. At 60° a vigorous reaction began. Heating was stopped and an ice-bath applied to the flask. The internal temperature rose to 73° and the reaction mixture solidified. 200 ml. of 50% aqueous alcohol were added and stirred and the mixture was heated an additional 1½ hours. After cooling, the reaction product was filtered and washed with water. The white product was amorphous and did not dry well, nor could it be crystallized.

It was dissolved in 250 ml. hot water, cooled, and made alkaline with 40% sodium hydroxide. The free base which separated was not very soluble in ether, and was taken up in benzene, dried over sodium hydroxide and obtained as a colorless, viscous oil on removing benzene in vacuo. The oil was converted to diacetate by dissolving in 200 ml. ethyl acetate and adding 12 ml. glacial acetic acid. The precipitated salt was filtered, washed with ethyl acetate and dried, M. P. 84° (bar).

In essentially the same manner as taught by Example 15, one may also react an alkylene diamine such as ethylenediamine and an acid, as, for example, hydrochloric, sulfuric or formic acid, to form the di-acid salt of the alkylene diamine, and using 0.25 mol. of the di-acid salt together with half a mol. of formaldehyde, half a mol. of the following compounds may be reacted therewith to form the corresponding symmetrical di-substituted alkylene diamines: cyclohexanone, 2,3 and 4-methyl-cyclohexanone, 4-methoxy-cyclohexanone, cyclopentanone, 2-methyl-thiophene, isoquinoline, 3-methyl-isoquinoline and quinaldine.

EXAMPLE 16

*Preparation of N-benzyl-N'-alpha-ethylbenzyl-ethylenediamine and salts thereof*

Dimethyl benzylaminoacetal (49 g., 0.25 mol.) and 1-phenyl-propylamine (34 g., 0.25 mol.) were mixed in a 500 ml. flask fitted with a reflux condenser with a drying tube. Formic acid (75 ml., 98–100%) was added all at once. A vigorous reaction ensued with darkening, evolution of heat and carbon dioxide. When the initial vigorous reaction had subsided, the mixture was heated. Ten minutes after attaining reflux, the rate of $CO_2$ evolution was 250 ml. per minute, decreasing to 0.6 ml. per minute in two hours. Removed excess formic acid under reduced pressure leaving a dark tarry residue to which was added 150 ml. 6 N HCl. After heating under reflux for one hour, cooled in ice-bath and made alkaline by addition of 50% aqueous sodium hydroxide. The resulting black supernatant layer was separated, diluted with 400 ml. ether and filtered to remove tar. The filtrate was dried over sodium hydroxide and treated with methanolic hydrochloric acid. The resulting tan precipitate was recrystallized from aqueous isopropanol (charcoal) forming white crystalline dihydrochloride, M. P. over 300°.

A portion recrystallized from aqueous methanol melted at 306° (bar). Calcd. for $C_{18}H_{26}N_2Cl_2$: C, 63.33; H, 7.68; N, 8.21. Found: C, 61.81; H, 6.96; N, 8.28.

The dipicrate was made by addition of aqueous lithium picrate to aqueous dihydrochloride. The yellow crystals were recrystallized from aqueous ethanol. Calcd. for $C_{30}H_{30}N_8O_{14}$: C, 49.59; H, 4.16; N, 15.43. Found: C, 48.26, H, 3.70; N, 15.55.

The dinitrate was made by addition of dilute nitric acid to aqueous dihydrochloride. The white crystals were recrystallized from aqueous ethanol, M. P. 278° C. Calcd. for $C_{18}H_{26}N_4O_6$: C, 54.80; H, 6.65; N, 14.20. Found: C, 52.85; H, 5.94; N, 14.92.

EXAMPLE 17

Preparation of N,N'-bis(p-methylbenzyl)-ethylenediamine and its salt

Six g. of p-xylylamine, 4.3 g. ethylene bromide and 10 cc. of butanol were refluxed for one hour. On cooling the solution became solid. The solid was filtered off, washed with butanol and ether, and dried at room temperature. After one crystallization from dilute alcohol it had M. P. 296° (bar).

The salt was then suspended in water and treated with 40% sodium hydroxide solution. The oil was extracted with ether, the ether layer dried over sodium sulfate, filtered and the ether removed. The residue was taken up in a little ether, glacial acetic acid added in sufficient amount to form the diacetate and the solid filtered and recrystallized from ethyl acetate. White crystals, M. P. 116°.

The ortho or meta-methylbenzyl compounds may be made similarly by starting with o- or m-xylylamine.

EXAMPLE 18

Preparation of 1,10 - bis(benzylamino)-decane and its salts

A solution of 39.4 g. decamethylene iodide and 21.4 g. benzylamine in 200 cc. isopropanol was refluxed about 4 to 5 hours. On standing overnight a white crystalline solid separated out which was filtered off, washed with ether, and dried yielding 1,10-bis(benzylamino) decane dihydroiodide, M. P. 238° (bar). More could be obtained from the mother liquor by concentration.

Five grams of the hydroiodide was suspended in water and treated with 40% sodium hydroxide solution, extracted with ether, the ether evaporated. The nearly colorless oil solidified to a colorless solid melting in the neighborhood of 40°. The solid was taken up in ether and glacial acetic acid added in an equivalent amount to form a diacetate. A white crystalline solid separated which was recrystallized from ethyl acetate: White, glistening flakes, M. P. 99° (bar). Calcd. for $C_{24}H_{36}N_2 \cdot 2CH_3COOH$: N, 5.94. Found: N, 5.87.

EXAMPLE 19

Preparation of 1,3 - bis(benzylamino)-propane and salts thereof 45 g. of benzylamine and 40.4 g. of trimethylene bromide were warmed on a steam-bath. In a few minutes a vigorous reaction set in, the liquid became very viscous and then rapidly solidified to a crystalline mass. The mixture was made alkaline with sodium hydroxide solution, extracted with ether, the ether layer then extracted with dilute acetic acid. The acid layer was made alkaline and extracted with ether. The ether layer was dried over magnesium sulfate, filtered through carbon, the ether removed and the residue fractionated. The 1,3-bis-(benzylamino)-propane had B. P. 124° at 0.55 mm., $n_D^{23}$ 1.5580.

The acetate was prepared by solution of the base in ether and addition of glacial acetic acid as long as a precipitate formed. The solid was filtered off, washed with ether and recrystallized from ethyl acetate. Small, white crystalline flakes, M. P. 132°. Calcd. for $C_{17}H_{22}N_2 \cdot 2CH_3COOH$: N, 7.49. Found: N, 7.29.

The hydrobromide was obtained by washing a portion of the original solid reaction product with water and recrystallizing first from water and then from alcohol. Small, white glistening flakes, M. P. 294°. Calcd. for $C_{17}H_{22}N_2 \cdot 2HBr$: N, 6.73; Br, 38.4. Found: N, 7.0; Br, 38.4. The picrate had M. P. 143° dec.

EXAMPLE 20

Preparation of 1,5 - bis - (benzylamino) - pentane and a salt thereof 39.7 g. of pentamethylene iodide and 27 g. of benzylamine were brought together. Much heat was evolved and after cooling somewhat the reaction mixture was warmed an hour on the steam-bath. The clear sirupy material on standing for several days became crystalline. Water was then added and the mixture was made alkaline and extracted with ether. The ether layer was extracted with dilute acetic acid. The acid extract was made alkaline and extracted with ether. The ether layer was dried over magnesium sulfate, filtered through carbon and the ether removed. The residue on fractionation yielded unchanged benzylamine, N - benzylpiperidine and 1,5 - bis-(benzylamino) - pentane. B. P. 121°/0.85 mm., $n_D^{22.5}$ 1.5577.

The acetate prepared by adding glacial acetic acid to an ethereal solution of the base, formed fine white crystals, M. P. 102°.

EXAMPLE 21

Preparation of N,N'-bis-(beta-phenylethyl)-ethylenediamine and a salt thereof 48.2 g. of beta-phenylethylamine and 18.8 g. ethylene bromide were warmed on the steam-bath. The reaction was vigorous and after standing some time at room temperature the mass crystallized. The reaction product was made alkaline, extracted with ether and the ether layer extracted with dilute acetic acid. The acid extract was made alkaline, extracted with ether; the ether layer dried over magnesium sulfate, filtered through carbon and the ether removed. The residue was then distilled; all volatile material was taken off up to 210° at 1.5 mm. The residue was taken up in ether and treated with glacial acetic acid. The solid was filtered off and recrystallized from ethyl acetate to give small white needles, M. P. 114°.

In the same manner as taught in Examples 7–9 and in the last three Examples 19–21, an alkylene dihalide such as 1,2-dichloroethane may be reacted with laurylamine, 3-methyl - cyclo - hexylamine, m-nitraniline, 2 - amino - 6-methyl-pyridine, 2 - amino - 4 - methyl-pyridine, 2-amino-5-methyl-pyridine, 2-amino-3-methyl-pyridine, 2-amino - thiazole, or 2 - amino-5-methyl-furan to form the symmetrically di-substituted alkylene diamine and desired salts thereof. The reaction mixture, after making strongly basic with alkali such as sodium hydroxide, may be extracted with ether and the ether extract distilled to obtain the desired product as a crystalline or solid residue.

EXAMPLE 22

*Preparation of N,N'-bis-(p-hydroxybenzyl)-ethylenediamine and its salts*

N,N'-bis-(p-methoxybenzyl)-ethylenediamine dihydrochloride (10 g.), 50 ml. 48% hydrobromic acid, and 15 ml. glacial acetic acid were heated under reflux for several hours. After cooling, insoluble starting material was removed by filtration, and the filtrate taken to dryness on the steam bath. The solid residue was taken up in hot isopropanol, filtered to remove some starting material, and the hot filtrate diluted with hexane to the cloud point. On cooling, there crystallized N,N'-bis-(p-hydroxybenzyl)-ethylenediamine dihydrobromide, M. P. 218° (bar). The dipicrate was recrystallized from aqueous alcohol, M. P. 193°.

Following the procedures disclosed hereinabove, the following compounds may be made and fall within the general scope of the invention. These compounds are also deemed useful, either as the free base or the acid-addition salts, for their therapeutic action, as intermediates or for the purpose of isolating penicillin salts.

| Monosubstituted diamines | Starting materials |
|---|---|
| N-undecylethylenediamine | undecylaldehyde and ethylenediamine diformate. |
| N-heptylethylenediamine | heptaldehyde and ethylenediamine diformate. |
| N-(3,5,5-trimethylhexyl)-ethylenediamine. | 3,5,5-trimethylhexaldehyde and ethylenediamine diformate. |
| N-2-thenylethylenediamine | thiophene, formaldehyde, ethylenediamine-di HCl salt. |
| N-p-chloro or bromophenylethylene diamine. | N-phenylethylene diamine and Cl$_2$ or Br$_2$. |
| N-vanillyl ethylenediamine | vanillin, ethylenediamine diformate. |
| N-2,4 or other dichloro or bromophenylethylene diamine. | N-phenylethylene diamine and Cl$_2$ or Br$_2$. |
| N-2- or 4-pyridylethylethylenediamine. | 2- or 4-picoline, formaldehyde, ethylenediamine di-HCl salt. |
| N-2- or 4-quinolylethyl ethylenediamine. | 2- or 4-quinaldine, formaldehyde, ethylenediamine di-HCl salt. |
| N-4-methoxycyclohexylethylenediamine. | 4-methoxycyclohexanone and ethylenediamine diformate. |
| *Disubstituted diamines* | |
| N,N'-di-n-heptylethylenediamine | heptaldehyde, ethylenediamine diformate. |
| N,N'-di-undecyl ethylenediamine | undecylaldehyde, ethylenediamine diformate. |
| N,N'-dicyclopentylethylenediamine. | cyclopentanone, ethylenediamine diformate. |
| N,N'-di-4-methoxy cyclohexylethylene diamine. | 4-methoxy cyclohexanone, ethylenediamine diformate. |
| N,N'-divanillylethylenediamine | vanillin, ethylenediamine diformate. |
| N-cyclohexyl-N'-ethylethylenediamine. | N-cyclohexylethylene diamine, acetaldehyde, H$_2$, (n:). |
| N-benzyl-N'-vanillylethylenediamine. | N-benzylethylene diamine, vanillin, formic acid. |
| N-methyl-N-phenylethylene diamine. | methyl aniline, chloracetal, followed by ammonium formateformic acid. |

The following examples illustrate the preparation of penicillin salts from the corresponding substituted alkylene diamines.

EXAMPLE 23

*Preparation of N-mono-benzylethylenediamine di-penicillin*

224 mg. of N-mono-benzylethylenediamine dihydrochloride was dissolved in about 2 cc. of water. To this a solution of 712 mg. of sodium penicillin dissolved in 2 to 3 cc. of water was added. A clear solution resulted from which an oil precipitated in a few minutes. The water layer was poured off and the oil placed in a desiccator over phosphorus pentoxide. In a short time white crystals appeared and all of the oil solidified. On heating at any temperature between 124 and 191°, this material melted and immediately solidified to a white foamy, very viscous mass. At 191° (bar) the solid melted to a liquid which darkened and decomposed without giving the white foamy mass.

EXAMPLE 24

*Preparation of N-mono-(p-hydroxybenzyl)-ethylenediamine di-penicillin*

240 mg. of N-mono-(p-hydroxybenzyl)-ethylenediamine dihydrochloride was dissolved in about 2 cc. of water. To this solution 712 mg. of sodium penicillin dissolved in about 2 to 3 cc. of water was added. An immediate white granular precipitate formed which was filtered off, washed with water and dried over phosphorus pentoxide. The M.P. was 131° (bar).

EXAMPLE 25

*Preparation of N,N'-dibenzylethylenediamine di-penicillin*

To a solution of 60 g. of sodium penicillin G in 800 cc. of distilled water cooled to 0–4° in an ice-bath, a solution of 35 g. of N,N'-dibenzylethylenediamine diacetate in 200 cc. of distilled water is added dropwise with stirring. The thick slurry is filtered with suction, washed twice with 100 cc. of cold water, dried by suction and spread out in a thin layer for completion of drying. The product weighed 80 g.

The air-dried powder has a broad melting point, sintering at 100°, melting above 110° to a cloudy liquid becoming clear at 135°. It has 7.7–9.6% water (of crystallization), which can be removed on drying in a Fischer pistol. Analysis of the dried sample showed: C, 63.86; H, 6.41; S, 6.74. Calcd. for $2C_{16}H_{18}O_4N_2S \cdot C_{16}H_{20}N_2$: C, 63.8; H, 6.20; S, 7.08. Ash was negligible. Assay showed on a dry basis 1235 units per mg. (calcd. 1307).

EXAMPLE 26

*Preparation of N,N'-dipiperonylethylenediamine di-penicillin*

To a solution of 1.07 g. sodium penicillin in about 2 ml. cold water, a solution of 0.7 g. N,N'-dipiperonylethylenediamine acetate in about 2 ml. cold water was slowly added with stirring. The white insoluble solid was filtered off, washed with water and dried over phosphorus pentoxide.

EXAMPLE 27

*Preparation of N,N'-difurfurylethylenediamine di-penicillin*

Sodium penicillin (1.07 g.) is dissolved in about 2 ml. water cooled in an ice-bath. To the clear solution, 0.5 g. of N,N'-difurfurylethylenediamine acetate dissovled in about 2 ml. of cold water is slowly added with stirring. A white, insoluble, crystalline powder is formed which is filtered off, washed with cold water and dried in a desiccator over phosphorus pentoxide.

It is obvious that the insoluble organic base penicillin salts formed contain two mols. of penicillin for each mol. of organic base when a disalt of the substituted diamine is used and when an excess of penicillin salt is present, as is indicated by the analysis of the N,N'-dibenxylethylenediamine salt, by the assays of the N,N'-dibenzyl-, N,N'-difurfuryl and N,N'-dipiperonylethylenediamine penicillin salts and by the observation that on addition of the sodium penicillin solution to the organic base salts an immediate precipitate forms which redissolves on shaking. It is also possible for the salt formed to be the mono-salt, that is the combination of one mol. organic base to one mol. of penicillin. This mono-penicillin salt may then be isolated, if desired. On further addition of sodium penicillin solution, a permanent precipitate forms which is the di-salt, that is, one mol. organic base to two mols. of penicillin. The penicillin salts can also be prepared by adding non-aqueous solutions of free penicillin to non-aqueous solutions of the organic bases by using suitable solvents such as ether, acetone, ethylacetate, amylacetate, etc.

Besides the penicillin salts hereinabove mentioned, the following mono- and di-penicillin salts are also deemed useful for the reasons indicated.

N-octylethylenediamine di-penicillin
N,N'-di-n-(iso, sec. or tert.) butylethylene diamine di-penicillin
N,N'-di-phenylethylenediamine di-penicillin
N,N'-di-1(or 2) naphthyl ethylene diamine di-penicillin
N,N'-di-2-pyridylethylenediamine di-penicillin
N-benzhydrylethylenediamine di-penicillin
N,N'-di-benzhydrylethylenediamine di-penicillin
N-veraterylethylenediamine di-penicillin
N,N'-di-veraterylethylenediamine di-penicillin
N - benzyl-N'-p-methoxybenzylethylenediamine di-penicillin
N,N'-dibenzyl-1-methylethylenediamine di-penicillin
N,N-dicyclohexylethylenediamine mono-penicillin
N,N-diamyl ethylenediamine mono-penicillin
N-ethyl-N-phenylethylenediamine mono-penicillin The penicillin salts corresponding to the illustrative examples are listed with their melting points:

| Organic base salt | Form of di-penicillin salt | M. P., °C. |
|---|---|---|
| N,N'-dibenzylethylenediamine diacetate. | White crystalline pwd. | ca. 110-135 |
| N,N'-dipiperonylethylene-diamine diacetate. | White pwd. or colorless crystals. | 112-119 |
| N,N'-bis-(p-chlorobenzyl)-ethylenediamine diacetate. | White crystals | 110-117 |
| N,N'-bis-(2,4-dichlorobenzyl)-ethylenediamine diacetate. | Yellowish prisms | 95-100 |
| N,N'-bis-(p-nitrobenzyl)-ethylenediamine diacetate. | White crystals | 95-100 |
| N,N'-bis-(p-hydroxybenzyl)-ethylenediamine dihydrochloride. | ___do___ | 140-145 |
| N,N'-bis-(-methoxybenzyl)-ethylenediamine diacetate. | ___do___ | 100-103 |
| N,N'-bis-(p-aminobenzyl)-ethylenediamine dihydrochloride. | White, granular cryst. | 144-8 |
| N-benzyl-N'-(alpha-ethylbenzyl)-ethylenediamine dihydrochloride. | White crystals | 105-8 |
| N,N'bis-(beta-phenylethyl)-ethylenediamine diacetate. | ___do___ | 95-102 |
| N,N'-bis-(gamma-phenyl-propyl)-ethylenediamine dihydrochloride. | ___do___ | 78-83 |
| 1,3-bis-(benzylamino)-propane diacetate. | ___do___ | 100-102 |
| 1,5-bis-(benzylamino)-pentane diacetate. | White glass | 120-140 |
| N,N'-difurfurylethylenediamine diacetate. | White crystalline pwd. | 83-86 |
| N,N'-di-2-thenylethylenediamine diacetate. | White crystals | 145-7 |
| N,N'-dicyclohexylethylenediamine diacetate. | ___do___ | 155-6 |
| N,N'-bis-(4-methyl-2-pentyl)-ethylenediamine diacetate. | Colorless solid | 165 |
| N,N'-bis-(2-heptyl)-ethylene diamine diacetate. | Crystalline solid | 75-85 |
| N,N'-bis-(3,5,5-trimethylhexyl)ethylenediamine dilthtate. | White crystals | 90-95 |
| N,N'-bis-(p-methylbenzyl)-ethylenediamine diacetate. | ___do___ | 90-97 |
| 1,10-bis-(benzylamino)-decane diacetate. | White solid | 106 |

These salts are insoluble in most of the usual laboratory solvents, but have very appreciable solubility in dimethyl formamide. By precipitating the salts from this solvent by addition of water judiciously, the particle size can be adjusted to any desired magnitude. Recrystallization may also be effected from acetone and formamide.

The solubility properties of the penicillin salts of the invention are such that many substituted alkylene diamines could be used in any stage of the recovery process for the isolation of penicillin. Since a substantial number of compounds, particularly those of higher molecular weight, are either insoluble or only sparingly soluble in water, a precipitation from the buffered penicillin extract is possible. With regard to N,N'-dibenzylethylenediamine, for example, the free base could be used for precipitation of penicillin from the amylacetate extracting liquors since the base is soluble in this medium. The diacetate or any other water-soluble salt could, of course, be used for the aqueous precipitation. The versatility of these compounds is clearly obvious.

When the diamine penicillin salts are used for therapeutic purposes, they may be used for injection either with a spreading agent such as hyaluronidase, with a suspending agent such as carboxymethyl cellulose or pectin, or in a vegetable oil vehicle either with beeswax or aluminum monostearate gel, the composition being made up in substantially the same manner as any other sparingly soluble penicillin salt known to the art.

The diamine penicillin salts herein disclosed vary in their solubility in water from sparing solubility to substantial insolubility. Because of this action, there is a variation in their therapeutic effects ranging from quickly measurable blood levels to delayed blood level measurements. The clinician is therefore given a wide choice of penicillin products with varying times of onset of action. Further variations may be made by mixing fast-acting and slow-acting compounds, whether this involves combinations of the diamine penicillin or combinations of procaine penicillin or other known compounds with one or more compounds of the invention.

The term "bar," as used throughout the examples and following a melting point temperature, means a melting point apparatus consisting of a heated bar upon which the sample is put, at about the melting point of the sample, such as the Maquenne block or the Dennis bar.

Many modifications and changes within the skill of the art are contemplated without departing from the scope of the invention as defined in the appended claims.

Having described our invention, we claim:

1. The new compound, N,N'-dibenzyl-ethylenediamine di-penicillin.

2. The new compound, N,N'-difurfuryl-ethylenediamine di-penicillin.

3. As a new compound, an N,N'-bis-(3,5,5-trimethylhexyl)-ethylene diamine penicillin.

4. As new compounds, the sparingly water-soluble penicillin salts of the mono- and di-substituted alkylene diamines having the formula $$R-NH \cdot (CH_2)_n \cdot NH-R_1$$

wherein R represents a radical selected from the group consisting of an alkyl having at least four carbon atoms, cyclopentyl, cyclohexyl, pyridyl-lower alkyl, thiophene-lower alkyl, furan-lower alkyl, quinolyl-lower alkyl, phenyl, naphthyl, diphenyl-methyl, phenyl-lower alkyl, piperonyl, halophenyl-lower alkyl, nitrophenyl-lower alkyl, hydroxyphenyl-lower alkyl, $NH_2$·phenyl-lower alkyl, lower-alkoxyphenyl-lower alkyl, lower alkylphenyl-lower alkyl, and alkoxy, hydroxyphenyl-lower alkyl radicals, and wherein $R_1$ represents a radical of the group consisting of hydrogen, alkyl, cyclopentyl, cyclohexyl, pyridyl-lower alkyl, thiophene-lower alkyl, furan-lower alkyl, quinolyl-lower alkyl, phenyl, naphthyl, diphenylmethyl, phenyl-lower-alkyl, piperonyl, halophenyl-lower-alkoxyphenyl-lower alkyl, lower-alkylphenyl-lower alkyl, and alkoxy, hydroxyphenyl-lower-alkoxyphenyl-lower alkyl, lower-alkylphenyl-lower alkyl, and alkoxy, hydroxyphenyl-lower alkyl radicals, while $n$ stands for an integer from 2 to 12 inclusive.

5. A salt of penicillin with N,N'-di-benzyl-ethylene diamine.

6. A salt of penicillin with N,N'-di-benzhydryl-ethylene diamine.

7. A salt of penicillin with N,N'-di-betaphenethyl-ethylene diamine.

8. A salt of penicillin with a diamine having the formula $$R·NH·(CH_2)_n·NH·R_1$$

wherein R and $R_1$ each represent alkyl radicals having at least four carbon atoms in the alkyl chain and where $n$ stands for a whole number from 2 to 12.

9. A salt of penicillin with a diamine having the formula $$R·NH·CH_2·CH_2·NH·R_1$$

wherein R and $R_1$ each represent alkyl radicals having at least four carbon atoms in the alkyl chain.

10. A salt of penicillin with a diamine having the formula $$R·NH·CH_2·CH_2·NH·R_1$$

wherein R and $R_1$ each represent a phenyl-lower alkyl radical.

11. A therapeutic composition comprising a liquid suspending medium, finely divided solid N,N'-dibenzylethylenediamine di-penicillin G, and a suspending agent for suspending said penicillin salt in said liquid medium.

JOSEPH LESTER SZABO.
WILLIAM F. BRUCE.

REFERENCES CITED

The following references are of record in the file of this patent:

UNITED STATES PATENTS

| Number | Name | Date |
|---|---|---|
| 2,527,810 | Goldberg et al. | Oct. 31, 1950 |
| 2,533,066 | Taplin | Dec. 5, 1950 |
| 2,547,640 | Goldman | Apr. 3, 1951 |
| 2,558,014 | Stiller | June 26, 1951 |

OTHER REFERENCES

Scudi et al.: "J. Biol. Chem.," vol. 164, July 1946, pp. 195–200.

Scudi: "J. Biol. Chem.," vol. 164, July 1946, pp. 183–194.

"The Chemistry of Penicillin," Princeton U. Press (1949), p. 90.

British Report CMR—Br. 234 (P. B.—79,927), December 5, 1947, p. 3.